Patented June 9, 1953

2,641,583

UNITED STATES PATENT OFFICE 2,641,583

PROCESS FOR PRODUCING SILICA GEL SPHERES IN OIL

John L. Gring, Homewood, Ill., assignor to Sinclair Refining Company, New York, N. Y., a corporation of Maine No Drawing. Application October 15, 1948, Serial No. 54,817

2 Claims. (Cl. 252—448)

My invention relates to improvements in the production of discrete particles of silica gel in substantially spherical form which are useful as catalyst bases and as solid adsorbents. More especially it resides in the production of improved silica microspheres in a single operation from stable sodium silicate solutions by dispersion in an acidic environment.

The emergence of catalytic cracking as the major modern process for converting petroleum fractions to high-grade gasoline products has enormously intensified the work of developing suitable catalysts and suitable catalyst supporting bodies. In view of the success of moving bed systems where large quantities of catalyst in finely divided, granular, or pellet form are circulated rapidly by means of pressure differentials in the system, aeration, air lift, or in the form of fluid suspensions or slurries; emphasis has long been placed upon development of catalysts having close size uniformity, in order to facilitate handling within the system, and upon smoothness and regularity of surface, in order to obtain improved flow characteristics and reduce equipment erosion problems. But catalysts for these processes continue to be produced in conventional practice by crushing and grinding procedures which characteristically produce large quantities of fines and result in general irregularity of size, shape, and surface. The presence of relatively large amounts of fines in virgin catalysts is disadvantageous because of excessively high catalyst losses by entrainment in the regenerating gases and in the hydrocarbon vapors. Further, the fines fraction tends to become segregated within the regeneration system and is subjected to continuous re-cycling therein without appreciable contribution of its catalyst values in the reaction system. Irregularity of surface is disadvantageous because the attrition produced in surface to surface contact tends to continuously produce additional large quantities of fines. Moreover, the problems of equivalent erosion are quite severe with rapidly moving bodies having sharp angular surfaces. Additionally, it should be observed that certain schemes of catalyst handling, such as moving a bed or column of catalyst by air or gas lift depend on the availability of closely sized catalyst particles.

Attempts to produce synthetic catalysts in the form of spherical or spheroidal pellets or particles have been confined to dispersion techniques operating upon colloidal solutions of the catalytic material. That is, the desired catalyst or catalyst support has been first prepared in the form of a hydrosol or a hydrogel or a slurried gel and then has been mechanically dispersed in some medium in which the sol or gel is coagulated or set by thermal or chemical means to solid bodies. Such methods, however, require preliminary preparation of a hydrosol under carefully controlled conditions and subsequent handling of an unstable sol rather than stable solutions of the ultimate components. Silica-containing hydrosols, for example, tend to build up troublesome coatings on the surface of the equipment and usually require the application of special surfaces to minimize adherence. Interruption or slow-down of the process is usually attended by premature gelation which clogs the system. In most instances the handling and dispersion of acidic hydrosols are involved so that expensive alloy or acid-resistant equipment is required. In addition, uniformity of product quality with respect to ionic structure is difficult to obtain in the production of spheroidal silica-containing particles by subdivision of colloidal dispersions. The silica-containing hydrosol is customarily prepared by mixing together relatively large volumes of acid and silicate, so that localized formation of hydrated silica results in inhomogeneities in the gelled product. It is necessary therefore to resort to controlled dilution, special mixing equipment, pre-chilling of the reactants to retard the gelling rate, or other expensive expedients to develop homogeneity and uniform quality of the gelled product.

I have now discovered, however, that a stable aqueous solution of sodium silicate may be dispersed so as to offer a high amount of surface for reaction in an acidic environment, and that rapid gelation in the form of spherical particles of silica hydrogel results with the reduction in pH of the silicate. For example, I have found that a stable aqueous solution of sodium silicate may be sprayed or atomized into an oil and gelled in that environment by an acidic agent which possesses an appreciable solubility in the oil, such as sulfur dioxide, to produce firm substantially spherical particles of silica gel in a single operation. The resulting particles may be processed by washing, impregnation, precipitation and the like to give catalytic compositions. Actually, sodium removal by washing is more rapid than in the case where other ions; e. g., aluminum or magnesium, are present, and an acidified wash medium may be employed without loss of valuable elements of the final composition. I have further found that it is advantageous to provide an aqueous layer of dilute acid such as sulfur dioxide in water, or dilute sulfuric acid or dilute sulfuric acid essentially saturated with dissolved sulfur dioxide under the acidic oil layer. The particles of silica gel settle from the acid oil and collect in the dilute aqueous acid layer from which they may be continuously or intermittently withdrawn as desired.

Sodium silicate is available in a number of commercial grades, of which I have particularly worked with "N" and "E" grades of the Philadelphia Quartz Company. I prefer to use the "N" or "E" grades which substantially represent sodium silicate containing combined $Na_2O$ and $SiO_2$ in proportions of 1 to 3.25, which have a pH of about 11.3, and the solutions of which are stable for months. Other forms of sodium silicate may be used, however. I consider aqueous solutions of one volume of sodium silicate to one, two, or three volumes of water practical concentrations for the purposes of my invention. Other silicate concentrations may be employed where size considerations warrant and appropriate modifications in manipulation are effected.

I have found that aqueous solutions of stable sodium silicate may be dispersed by means of spray atomization and when the discharge is effected into an acidified oil, the particles quickly set to small spheres of silica hydrogel. The size of the spheres is essentially determined by the dispersion step. For example, gel spheres in the approximate range of from 10 to 100 microns are produced by spraying through orifices of 0.018" in diameter. With gas or vapor atomization of the silicate solution, the particle size is also largely controlled by variation in the spray pressure. Other factors of consequence are variations in density and temperature of the silicate solution, the velocity with which the silicate solution hits the oil surface and the viscosity of the oil.

Although aqueous solutions of sodium silicate are highly stable and may be stored for months, the solution reacts and quickly sets to a firm gel if the pH of the solution is reduced below approximately 10. The gelling time varies from a matter of a few seconds to a minute or more. According to my invention, I may spray the stable sodium silicate solution into a vessel containing a layer of an oil which has been saturated with sulfur dioxide and which advantageously contains an underlying layer of dilute aqueous acid. The depth, gravity and viscosity of the oil should be selected or adjusted according to the size of the silicate droplets so that the residence time of the droplets in the oil will be sufficient to substantially effect gelation. Establishing a temperature gradient in the oil layer is advantageous. The underlying aqueous acid layer may comprise dilute sulfuric or sulfurous acid, or mixtures thereof, or hydrochloric acid, for example. One advantage of using an underlying layer of dilute acid is that once the surface of the spheres has gelled in the oil, gelation may be completed in the acid layer. I have found that the presence of a little sulfuric acid in addition to the sulfurous acid, or dissolved sulfur dioxide, is beneficial, inasmuch as complete gelling of the spheres is accelerated.

The silicate solution is advantageously sprayed from a point above the surface of the oil so that the droplets of solution assume spherical form. Where a relatively small nozzle in relation to the surface area of the oil is used, the nozzle should be shifted rapidly over the oil surface to prevent undue localized accumulation of the sprayed droplets. Otherwise, I have found that some clustering of individual microspheres results. The prevention of clustering may be also effected by moving the oil layer in case it is desired to use a fixed position for the spray nozzle. Of course, various dispersion techniques may be employed; e. g., pressure spraying types or centrifugal atomization. If desired, metallic ions of value in the final catalyst composition may be included in the underlying aqueous acidic layer for the purpose of partially impregnating the siliceous hydrogel.

The principles of my invention will be illustrated in the following examples which are offered for the purpose of illustration only and do not define process limitations.

*Example I*

A sodium silicate solution containing one volume of Philadelphia Quartz Company "E" grade silicate to one volume of water was prepared, and dropped into an acidic environment composed of benzene (18 parts by weight), carbon tetrachloride (82 parts), and glacial acetic acid (3.7 parts). The trial was repeated using benzene plus carbon tetrachloride plus dissolved hydrochloric acid. In each instance the gelation of the sodium silicate resulted, and by providing a distance of free fall of the silicate solution above the liquid surface, substantially spherical gelled bodies were obtained. The pellets were recovered by decantation and were air dried overnight. They proved difficult to crush between the fingers in the morning.

*Example II*

A solution containing one volume of Philadelphia Quartz Company "E" grade sodium silicate was dissolved in one volume of water. A quantity of water containing dissolved sulfur dioxide, i. e., sulfurous acid, and a sufficient quantity of a light neutral lubricating oil to give an oil layer of approximately 5" in depth were charged to a cylindrical vessel having a draw-off at the bottom. The oil layer was saturated with sulfur dioxide by continuously bubbling the gas into the aqueous layer in such manner that bubbles also rose through the oil layer. The silicate solution was sprayed, using air pressure and an 0.018 inch diameter spray orifice, into the oil from a point about 6 to 9 inches above the surface of the oil plus sulfur dioxide. 200 ml. of the one-to-one aqueous silicate solution were discharged in approximately 35 seconds. During the discharge the spray nozzle was rapidly shifted over the oil surface to prevent localized accumulation of the sprayed droplets and resulting clusters of the gelled microspheres. The microspheres settled into the dilute aqueous acid layer from whence they were withdrawn. Examination under a microscope at a magnification of 100 demonstrated the regularity of the resulting microspheres in shape and size. The particles were firm smooth solids and were substantially spherical in shape. Using the 0.018" diameter discharge orifice, the gelled spheres were essentially in the size range of 0.001 to 0.008" in diameter, corresponding to approximately 12.5 to 100 microns. Smaller particles but of similar physical character were produced by repeating this procedure using an 0.007" diameter discharge orifice.

Although I have found that an acidic oil represents a peculiarly practicable environment for rapid gelation of dispersed silicate droplets, other acidic media may be employed. Also, I have found that sulfur dioxide is a particularly advantageous gelling agent for the acidification of the oil layer. It is sufficiently soluble in the oil, and the silica microspheres produced show good surface and size uniformity. Further, its cost is significantly lower than most acidic agents including the sulfuric acid solutions usually employed in commercial practice. Other acids, however, which are miscible with or soluble in oil are useful. For example, I have used hydrogen chloride in the oil layer and a one molar aqueous solution of hydrochloric acid as the dilute acid medium underneath. I have also used carbon dioxide in the oil layer with one molar sulfuric acid underneath. I have further found that an oil containing 3.5 volume per cent of glacial acetic acid in solution, using one molar sulfuric acid beneath, resulted in silica gel microspheres of superior quality. Instead of acetic acid or other organic acid dissolved in the oil I consider that a liquid, essentially water-immiscible, organic acid; e. g., valeric or caproic acid, may be used where its reaction with sodium silicate sufficiently reduces the pH to produce quick gelling. I also consider an oil layer containing an oil-soluble sulfonic acid useful for effecting initial gelation of the sodium silicate droplets. On the other hand, I have found that I could not prepare alumina in the form of microspheres by spraying sodium aluminate solution into oil containing a dissolved acid by analogy to the process of this invention.

The spheroidal silica particles produced according to my invention may be dried, activated, or impregnated by presently known means. They may be washed free of traces of sodium or other contamination prior to drying if desired. The drying or activation processes may be selected so as to modify the gel characteristics of surface area, pore structure, apparent density, etc. by production of xerogel, aerogels, or other types. The silica spheres have useful absorbent and adsorptive properties and may be used as such but are most advantageously utilized as catalyst carriers. They may be impregnated with substances by methods known to the art in order to produce catalytically active products. The use of silica gel particles in catalyst production affords flexibility in operation by providing a single starting material for diversified impregnation to yield catalysts having a wide range of final compositions, thus favoring mass production and reducing production time.

I claim:

1. In the production of discrete particles of silica gel in substantially spherical form, the improvement which consists of spraying a stable aqueous solution of sodium silicate above an oil saturated with sulfur dioxide wherein the sprayed droplets of said solution drop into the oil, and recovering the particles from the acidic oil.

2. The process for producing discrete particles of silica hydrogel in substantially spherical form which comprises spraying a stable aqueous solution of sodium silicate above an oil saturated with sulfur dioxide wherein the sprayed droplets of said solution drop into the oil, collecting the resulting gelled particles in a dilute aqueous acid solution underlying the oil and recovering the particles from said solution.

JOHN L. GRING.

References Cited in the file of this patent

UNITED STATES PATENTS

| Number | Name | Date |
|---|---|---|
| 1,843,576 | McClure et al. | Feb. 2, 1932 |
| 2,435,379 | Archibald | Feb. 3, 1948 |
| 2,442,884 | Webb et al. | June 8, 1948 |
| 2,448,460 | Pierce et al. | Aug. 31, 1948 |
| 2,450,394 | Brown et al. | Sept. 28, 1948 |
| 2,455,445 | See et al. | Dec. 7, 1948 |
| 2,506,316 | Pierce | May 2, 1950 |

FOREIGN PATENTS

| Number | Country | Date |
|---|---|---|
| 55,553 | Russia | Nov. 4, 1938 |